United States Patent [19]

Bragdon

[11] 3,856,922

[45] Dec. 24, 1974

[54] PROCESS FOR PREPARING SUBSTANTIALLY NON-CAKING SODIUM CHLORIDE

[76] Inventor: Robert W. Bragdon, 10 Batchelder Rd., Marblehead, Mass. 01945

[22] Filed: Nov. 6, 1973

[21] Appl. No.: 413,345

[52] U.S. Cl.................... 423/268, 423/267, 423/499
[51] Int. Cl.............................................. C01d 3/04
[58] Field of Search..................... 423/268, 267, 499

[56] References Cited
UNITED STATES PATENTS 2,990,246   6/1961   Scott et al........................... 423/499
3,556,718   1/1971   Bachmann et al.................. 423/268

*Primary Examiner*—Edward Stern
*Attorney, Agent, or Firm*—Elton Fisher; Kenneth E. Prince

[57] ABSTRACT

Treating crystalline sodium chloride with N-2-acetamide iminodiacetic acid or N,N-bis-(2,2'-acetamido)-glycine renders the sodium chloride substantially non-caking and modifies the appearance of the sodium chloride crystals.

6 Claims, No Drawings

PROCESS FOR PREPARING SUBSTANTIALLY NON-CAKING SODIUM CHLORIDE

BACKGROUND OF THE INVENTION

This invention is in the field of sodium chloride. More particularly it is in the field of modifying the appearance of sodium chloride by treating it with N-2-acetamide iminodiacetic acid (hereinafter MA) or N,-N-bis(2,2'-acetamido)glycine (hereinafter DA). The treated crystalline sodium chloride is substantially non-caking.

MA has the formula

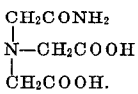

DA has the formula

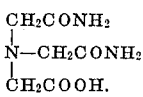

Prior art methods for modifying the appearance or the crystal habit of sodium chloride or for decreasing the tendency of sodium chloride to cake are well known. Such methods are taught by the following U.S. Pat. Nos: 2,539,012, Diamond et al; 2,642,335, May et al; 2,990,246, Scott et al; 3,000,708, Kapsenberg et al; 3,095,281, Schinkel et al; 3,148,023, Ploss; 3,174,825, Birchall et al; 3,281,206, van Weele et al; 3,556,718, Bachmann et al; 3,558,512, Jacoby et al; 3,567,371, Birchall;

British Patent Specification No. 1,003,216 teaches that sodium chloride crystals obtained by crystallizing sodium chloride form a brine in the presence of nitrilotriacetamide, $N \equiv (CH_2CONH_2)_3$, are three-dimensional dendrites.

I do not obtain dendrites where crystallizing sodium chloride from brine in the presence of MA or DA. Neither do I obtain dendrites where treating cubic sodium chloride crystals (conventional crystalline sodium chloride) with aqueous solutions of MA or DA.

Methods for inhibiting the caking of inorganic salts are taught by L. Phoenix, British Chemical Engineering, Vol. 11, No. 1 (Jan. 1966), pp. 34-38.

The crystal habit of sodium chloride and the modification thereof is taught by Kirk-Othmer, "Encyclopedia of Chemical Technology", Vol. 18, pp. 478-480 (1969).

SUMMARY OF THE INVENTION

In Summary, this invention is directed to a process for preparing substantially non-caking crystalline sodium chloride from a sodium chloride brine containing an amount of MA or DA effective for causing the product crystalline sodium chloride to have a modified appearance and to be substantially non-caking.

DESCRIPTION OF PREFERRED EMBODIMENTS

The following procedures and compositions represent preferred embodiments of the instant invention:

1. A process for changing the appearance of crystalline sodium chloride comprising admixing conventional sodium chlorided crystals with a solution consisting essentially of water and an amount of MA or DA effective for modifying the appearance of the sodium chloride crystals, the solution and the sodium chloride crystals being admixed in amounts to provide 10-1000 parts of MA or DA per million parts of sodium chloride.
2. A free-flowing non-caking sodium chloride composition consisting essentially of crystalline sodium chloride and MA or DA, the MA or DA being present in an amount effective for rendering the composition non-caking.
3. Transparent non-caking sodium chloride crystals containing an amount MA effective for rendering the sodium chloride crystals non-caking.
4. A free flowing mixture consisting essentially of an intimate mixture of particulate sodium chloride and MA or DA, the MA or DA being present in an amount effective for rendering the particulate sodium chloride free flowing (e.g., 10-1000 parts of MA or DA per million parts of sodium chloride).
5. A process for reducing the tendency of crystalline sodium chloride to cake characterized in that to the solid crystalline sodium chloride is added an amount of MA or DA effective for reducing the caking tendency of the crystalline sodium chloride (e.g., 10-1000 parts of MA or DA per million parts of sodium chloride).

DETAILED DESCRIPTION OF THE INVENTION

Where treating particulate sodium chloride with a solution of DA or MA (i.e., where admixing particulare sodium chloride with an aqueous solution of DA or MA) to render the particulate sodium chloride substantially non-caking and/or to change the appearance of crystalline sodium chloride I generally prefer to use a solution of DA or MA which contains about 2-5% (more preferably about 3-4%) DA or MA, but I have obtained excellent results with more dilute and more concentrated solution of DA or MA.

MA can be prepard by a process comprising reacting nitrilotriacetonitrile (NTAN) with aqueous sodium hydroxide— using 2 moles of sodium hydroxide per mole of NTAN at about 65°C. The product is disodium N-2-acetamide-iminodiacetate. This reaction is represented by the following equation:

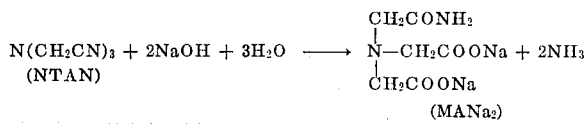

Disodium N-2-acetamide iminodiacetate (MANa₂) can be converted to N-2-acetamide iminodiacetic acid hydrochloride (MA·HCl) by reacting it with hydrochloric acid according to the reaction represented by the following equation:

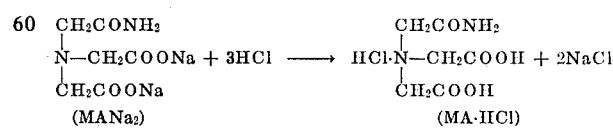

N-2-acetamide iminodiacetic acid hydrochloride can be converted to free N-2-acetamide iminodiacetic acid (MA) by reacting it with a stoichiometric amount of sodium bicarbonate (sodium hydrogen carbonte) according to the following equation:

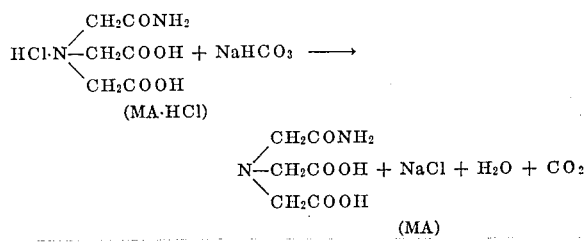
(MA)

MA, which is also known as N-acetamide-iminodiacetic acid (AIA) can also be prepared by a process comprising preparing a solution of NTAN by dissolving 67 g (0.5 mole) of NTAN in 200 g of water at 95°C and adding thereto one mole (40 g) of sodium hydroxide dissolved in 200 ml of water while maintaining the resulting mixture at about 95°C. It is desirable that the sodium hydroxide be added slowly while stirring the solution to which it (the sodium hydroxide solution) is added. After all of the sodium hydroxide has been added the resulting mixture should be maintained at about 95°C until evolution of ammonia has been completed; this requies about 2-3 hours. The resulting ammonia free solution is cooled to about 20°C and its pH is adjusted to 2 by adding 18 molar sulfuric acid thereto to precipitate the product MA as the free acid - i.e., as

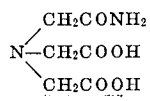

DANa is known to those skilled in the art. It can be converted to DA·HCl by treating with hydrochloric acid, and DA·HCl can be converted to a DA by treating with $NaHCO_3$. The following equations represent the reactions involved:

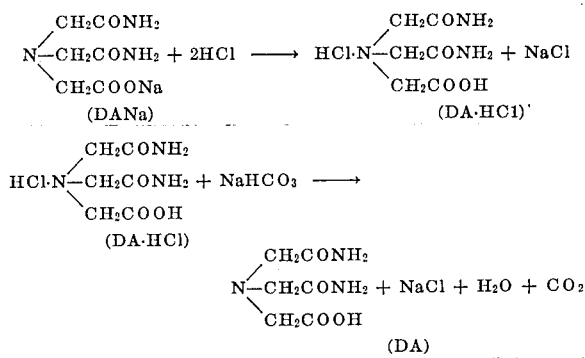
(DA)

Sodium chloride is well-known article of commerce. Unfortunately, sodium chloride, which is usually sold and shipped in particulate form, has a decided tendency to cake-especially where exposed to a humid atmosphere such as that prevaling in California in the winter time and in the eastern part of the United States in the summer.

This invention relates to a procedure which I have developed for substantially eliminating the caking tendency of sodium chloride including the tendency of sodium chloride to cake when it (the sodium chloride) is exposed to a humid atmosphere.

The method comprises admixing the sodium chloride with an amount of MA or DA effective for eliminating (or substantially eliminating) the tendency of the particulate sodium chloride to cake.

Preferred methods for admixing particulate sodium chloride with MA or DA include; (a) crystalizing sodium chloride from a brine containing the MA or DA; and (b) treating the particulate sodium chloride with an aqueous solution of MA or DA.

In either method the sodium chloride is admixed with an amount of MA or DA effective for reducing the caking tendency of the sodium chloride. The amount of MA or DA used is not critical and a finite amount produces a finite reduction in the caking tendency of sodium chloride. However, I have found that the best results are obtained where using about 10-1000 parts of MA or DA per million parts of sodium chloride. Quantities greater than 1000 parts of MA or DA per million parts of sodium chloride do not produce any greater improvement in the caking tendency of the sodium chloride than do 1000 parts. Hence, while much greater quantity than 1000 parts of MA or DA per million parts of sodium chloride can be used no advantages can be obtained in so doing. Also, it was found that when the quantity of MA or DA used is less than about 5 parts per million parts of sodium chloride the effect (improvement in caking tendency to particulate sodium chloride) is somewhat diminished.

The MA or DA can be added as; (a) the free amide; (b) as an acid salt (e.g., as the hydrochloride of DA or MA, as the acetate of DA or MA, as a sulfate of DA or MA, as a phosphate of DA or MA, or the like); or (c) as an alkali metal (preferably sodium) or ammonium salt (e.g., as a sodium salt of DA or MA, as an ammonium salt of DA or MA or as a potassium salt of DA or MA).

It has been found that MA, MA hydrochloride (MA·HCl) and the sodium salt of MA(MANa₂) are equivalent for rendering particulate sodium chloride substantially non-caking and for modifying the appearance of crystalline sodium chloride. Thus MA·HCl or MANa₂ can be substituted for MA on a mole for mole basis in my process and in my composition.

It has also been found that DA, DA hydrochloride (DA·HCl), and the sodium salt of DA (DANa) are equivalent for rendering sodium chloride substantially non-caking. Thus DA·HCl or DANa can be substituted for MA on a mole for mole basis in my process and in my composition.

Accordingly, it is understood that where I state MA herein equivalent results can be obtained by replacing all or part of the MA with MA·HCl or MANa₂. It is also understood that where I state DA herein equivalent results can be obtained by replacing all or part of the DA with DA·HCl or DANa.

The instant invention will be better understood by referring to the following specific but non-limiting examples. It is understood that said invention is not limited to these examples which are offered merely illustrations; it is also understood that modifications can be made without departing from the spirit and scope of the invention.

EXAMPLE 1

A 0.2 g portion of MA was dissolved in 6 ml of water. Said solution was admixed with a 200 gram portion of particulate reagent grade sodium chloride having a particle size substantially the same as that of ordinary table salt.

This provided 100 parts per million of MA based on the weight of the sodium chloride. The thus moistened sodium chloride was well mixed, formed into a cake having diameter of about 2¾ inches, pressed with a pressure of about 2–3 psig and allowed to dry for 24 hours at room temperature (ca 25°C).

A blank or control was run using the identical technique except that 6 ml of water rather than 6 ml of the solution of MA in water was used to moisten the sodium chloride.

The relative hardness of the resulting cakes was compared by dropping the cakes from a height of about 18 inches onto a stone table top. The cake made from the sodium chloride treated with the MA broke into small particles while the cake made by treatment with water (without the MA) remained intact when dropped onto the same table top from the same height.

In the above run the MA used was the hydrochloride of MA. Identical results were obtained when the hydrochloride was replaced with the free MA, and with the sodium salt of MA, using in each instance 100 ppm of the MA moiety

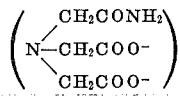

based on the weight of the sodium chloride.

Identical results were obtained in the runs where using 10, 50, 500, 1000, and 10000, ppm of MA. Identical results were also obtained where in MA was added as MANa$_2$ and as MA·HCl rather than as MA per se.

EXAMPLE 2

The general procedure of Example 1 was repeated; however, in this instance the procedure was modified by replacing the MA with DA (added as the hydrochloride). In this instance the cake of sodium chloride which was treated with DA at the rate of 100 parts of DA moiety

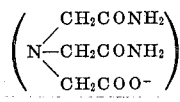

per million parts of sodium chloride broke into small fragments when dropped from 18 inches onto a stone table top.

The sodium chloride particles which were prepared by treating particulate sodium chloride with aqueous DA were observed to be opaque cubes rather than clear cubes while sodium chloride particles treated with water were clear cubes.

Identical results were obtained where using 10, 50, 500, and 1000, ppm of the DA moiety.

Identical results were also obtained where the DA was added as the sodium salt and as free DA applied at the rate of 50, 500, and 1000 ppm of DA moiety.

EXAMPLE 3

DA, added as hydrochloride, was admixed with a saturated sodium chloride brine in an amount to provide 100 parts of the DA moiety per million parts of sodium chloride present in the saturated sodium chloride brine.

A small portion of the brine was allowed to evaporate slowly in a watch glass. Incipient crystallization was observed under a 40 power microscope. The resulting crystals were opaque cubes while crystals from a blank (or control run) in which the DA was omitted were perfectly clear cubes.

Similar results were obtained when the DA was added as the sodium salt and as free DA.

EXAMPLE 4

The general procedure of Example 3 was repeated. However, in this instance the DA was replaced with MA (added as the hydrochloride). Crystals obtained from the brine treated with MA were perfectly clear but, the corners of the cubes were "lopped off" to produce 14 sided particles.

Crystals obtained in Example 1 from sodium chloride which had been treated with MA were found, on examination under the microscope to be cubes with the corners lopped off (i.e., 14 sided particles). On the other hand, sodium chloride particles which had been crystallized from water without an additive present (the control run of Example 1) were perfectly clear cubes.

EXAMPLE 5

Sodium chloride was crystallized from a 100 gallon batch of brine (drawn from a lot of nearly saturated sodium chloride brine) by evaporating water therefrom. Before starting the evaporation MA was added thereto (as the hydrochloride salt) in an amount to provide 100 parts of the MA moiety per million parts of sodium chloride present in the brine (i.e., the Ma moiety was provided at a rate of 100 ppm).

The recovered sodium chloride crystals were clear, but the corners of the cubes were "lopped off" to produce 14 sided particles.

A 200 g portion of said recovered sodium chloride was admixed with 6 ml of water, formed into a cake having a diameter of about 2¾ inches, pressed under a pressure of about 2–3 psig, and dried for 24 hours at room temperature. The dried cube of said recovered sodium chloride broke into small particles when dropped onto a stone table top from a height of 18 inches while a similar cake made from sodium chloride crystals (clear cubes) recovered from the same lot of brine but without the MA additive remained intact where dropped onto the same table top from the same height.

Identical results were obtained where using 10, 50, 500, and 1000 ppm of the MA moiety added as the hydrochloride. Identical results were also obtained where the MA hydrochloride was replaced with MA per se (free MA) and with the sodium salt of MA (MANa$_2$).

In each instance where testing sodium chloride particles recovered from brine in which the MA moiety was present in amounts greater than about 5 ppm based on the sodium chloride content of the brine a cake formed by admixing 6 ml of water with 200 g of the sodium chloride crystals pressing the cake under a pressure of about 2–3 psig, and drying the cake for 24 hours at room temperature broke into small pieces when dropped onto a stone table top from a height of 18 inches thereby establishing that the MA moiety rendered the particulate sodium chloride non-caking. Such sodium chlordide (that recovered from the MA-containing brine) was a free flowing particulate solid.

EXAMPLE 6

Sodium chloride was crystallized from a 100 gallon batch of brine (taken from a lot of nearly saturated sodium chloride brine) by evaporating water therefrom. Before starting the evaporation DA was added thereto (as the hyrochloride salt) in an amount to provide 100 ppm of the DA moiety per million parts of sodium chloride present in the brine.

The recovered sodium chloride crystals were opaque cubes while sodium chloride crystals recovered from the same lot of brine but without an additive (DA or MA) were clear cubes.

A 200 g portion of said recovered sodium chloride was admixed with 6 ml of water, formed into a cake having a diameter of about 2¾ inches, pressed under a pressure of about 2–3 psig, and dried for 24 hours at room temperature. The dried cake of recovered sodium chloride broke into small particles when dropped onto a stone table top from a height of 18 inches while a similar cake made from sodium chloride recovered from the same lot of brine but without the DA remained intact where dropped onto the same table top from the same height.

Identical results were obtained where using 10, 50, 500, and 1000 ppm of the DA moiety added as the hydrochloride. Identical results were also obtained where the DA hydrochloride was replaced with DA per se and with the sodium salt (DANa).

In each instance where the DA moiety was present in amounts greater than about 5 ppm based on the sodium chloride content of the brine a cake formed by admixing 6 ml of water with 200 g of the sodium chloride crystals pressing the cake under a pressure of about 2–3 psig, and drying the cake for 24 hours at room temperature broke into pieces when dropped onto a stone table top from a height of 18 inches thereby establishing that the DA moiety rendered the particulate sodium chloride non-caking. Such sodium chloride (that recovered from the DA-containing brine) was a free flowing particulate solid.

In no instance were the crystals obtained in any of the above runs dendritic.

As used herein, the term "mole" has its generally accepted meaning, that is a mole of a substance is that quantity of the substance which contains the same number of molecules of the substance as there are atoms in 12 g of pure $^{12}C$.

As used herein, the term "percent (%)" means parts per hundred.

As used herein, the term "parts" means parts by weight.

As used herein, the term "g" means gram or grams.

As used herein, the term "ppm" means parts per million.

As applied to MA the term ppm means parts of the MA moiety

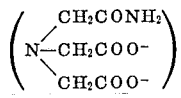

per million parts of NaCl; and as applied to DA the term ppm means parts of the DA moiety

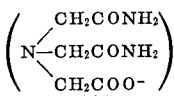

per million parts of NaCl.

As used herein, the term "psig" means pounds per square inch, gauge pressure.

As used herein, the term "MA" means N-2-acetamide-iminodiacetic; its formula is

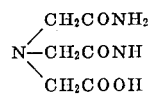

As used herein, the term "DA" means N,N-bis(2,2'-acetamido)glycine; its formula is

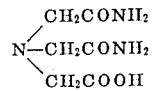

As used herein the term "room temperature" means about 20°–28°C.

As used herein, the term "MA hydrochloride (or MA·HCl)" means

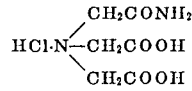

As used herein, the term "DA hydrochloride (or DA·HCl)" means

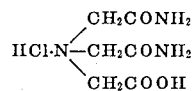

As used herein, the term "sodium salt of MA (or MANa₂)" means

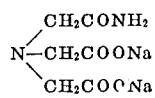

As used herein the term "sodium salt of DA (or DANa)" means

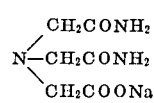

I claim:

1. A process for preparing substantially non-caking crystalline sodium chloride comprising crystallizing the sodium chloride from a sodium chloride brine containing an amount N-2-acetamide iminodiacetic acid or N,-N-bis-(2,2'-acetamido)glycine effective for causing the product crystalline sodium chloride to be substantially non-caking.

2. A process for rendering the sodium chloride substantially non-caking comprising admixing sodium chloride crystals with a solution consisting essentially of water and an amount of N-2-acetamide iminodiacetic acid or N,N-bis-(2,2'-acetamido)glycine effective for rendering the sodium chloride crystals substantially non-caking, the solution and the sodium chloride crystals being admixed in an amount to provide the weight ratio 10–1000 parts of N-2-acetamide iminodiacetic acid of N,N-bis-(2,2'-acetamido)glycine per million parts of sodium chloride and drying the sodium chloride crystals.

3. A free-flowing non-caking sodium chloride composition consisting essentially of crystalline sodium chloride and N-2-acetamide iminodiacetic acid or N,N-bis-(2,2'-acetamido)-glycine in an amount effective for rendering the compositon non-caking.

4. Transparent non-caking sodium chloride crystals containing an amount of N-2-acetamide iminodiacetic acid effective for rendering the sodium chloride crystals non-caking.

5. A free flowing mixture consisting essentially of an intimate mixture of particulate sodium chloride and N-2-acetamide iminodiacetic acid or N,N-bis-(2,2'-acetamido) glycine, the N-2-acetamide iminodiacetic acid or N,N-bis-(2,2'-acetamido)glycine being present in amount effective for rendering the particulate sodium chloride free flowing.

6. A process for reducing the tendency of crystalline sodium chloride to cake characterized in that to the solid crystalline sodium chloride is added an amount N-2-acetamide-iminodiacetic acid or N,N-bis-(2,2'-acetamido)glycine effective for reducing the caking tendency of the crystalline sodium chloride.

* * * * *

PO-1050
(5/69)

UNITED STATES PATENT OFFICE
CERTIFICATE OF CORRECTION

Patent No. 3,856,922    Dated December 24, 1974

Inventor(s) Robert W. Bragdon

It is certified that error appears in the above-identified patent and that said Letters Patent are hereby corrected as shown below:

In line 54 of Column 8 change "of" to --or--.

In line 60 of Column 8 change "bis-(2,2'-acetamido)-glycine"

to --bis-(2,2'-acetamido)glycine--.

In line 69 of Column 8 change "acetamido) glycine" to

--acetamido)glycine--.

Signed and sealed this 4th day of March 1975.

(SEAL)
Attest:

RUTH C. MASON
Attesting Officer

C. MARSHALL DANN
Commissioner of Patents
and Trademarks